US007093192B2

(12) United States Patent
Mullen et al.

(10) Patent No.: US 7,093,192 B2
(45) Date of Patent: Aug. 15, 2006

(54) ESTABLISHING AND DISPLAYING DYNAMIC GRIDS

(75) Inventors: Peter Mullen, Seattle, WA (US); Barry Christopher Allyn, Mill Creek, WA (US)

(73) Assignee: Microsoft Corporation, Redmond, WA (US)

( * ) Notice: Subject to any disclaimer, the term of this patent is extended or adjusted under 35 U.S.C. 154(b) by 579 days.

(21) Appl. No.: 10/798,789

(22) Filed: Mar. 11, 2004

(65) Prior Publication Data

US 2004/0239693 A1    Dec. 2, 2004

Related U.S. Application Data

(63) Continuation of application No. 09/364,689, filed on Jul. 30, 1999, now abandoned.

(51) Int. Cl.
    *G06F 15/00*    (2006.01)
(52) U.S. Cl. ............... 715/502; 715/518; 715/521; 715/530; 345/418; 345/677
(58) Field of Classification Search ............... 715/518, 715/530, 521, 502; 345/418, 677
    See application file for complete search history.

(56) References Cited

U.S. PATENT DOCUMENTS 5,444,929 A * 8/1995 Joseloff ..................... 40/759
5,490,241 A * 2/1996 Mallgren et al. ........... 345/440
5,873,106 A * 2/1999 Joseph ....................... 715/506
5,923,329 A * 7/1999 Beale ......................... 345/418
6,065,021 A * 5/2000 George ....................... 715/502
6,308,144 B1* 10/2001 Bronfeld et al. ............ 703/2
6,359,695 B1* 3/2002 Takahashi et al. ......... 358/1.1
6,448,964 B1* 9/2002 Isaacs et al. ............... 345/419
6,492,989 B1* 12/2002 Wilkinson .................. 345/440
6,724,392 B1* 4/2004 Wiley et al. ................ 345/581

OTHER PUBLICATIONS

Fedak, Chris and Carl Gutwin, "A Comparison of Fisheye Lenses for Interactive Layout Tasks", May 17-19, 004, Canadian Human-Computer Communications Society in the Proceedings of Graphics Interface 2004, p. 213-220.*
Visio Corporation, "Laying Out Shapes Automatically," Using Visio Products, Copyright 1997 Visio Corporation (pp. 151-168).

* cited by examiner

*Primary Examiner*—Doug Hutton
*Assistant Examiner*—R. Singh
(74) *Attorney, Agent, or Firm*—Perkins Coie LLP

(57) ABSTRACT

A computer system that assists the user of computer drawing programs to accurately place new objects on a drawing is described. The system establishes and displays dynamic gridlines according to objects already placed on the drawing. As a new object is dragged for placement on the drawing, the system analyzes the areas around the new object for already-placed objects. The system then determines the spacing between the already-placed objects and indicates to the user where the dragged object should be placed to maintain the same spacing as the objects already placed on the drawing.

34 Claims, 9 Drawing Sheets

ESTABLISHING AND DISPLAYING DYNAMIC GRIDS

CROSS-REFERENCE TO RELATED APPLICATION

This application is a continuation of U.S. patent application Ser. No. 09/364,689 filed on Jul. 30, 1999, now abandoned and is hereby incorporated by reference in its entirety.

TECHNICAL FIELD

The present invention is directed to the field of computer drawing programs, and more particularly, to the field of positioning drawing elements.

BACKGROUND OF THE INVENTION

Computer drawing programs assist a computer user in producing and editing such drawings as block diagrams, flowcharts, maps, office layouts, organizational charts, project schedules, and other types of drawings.

Within each drawing can be a multitude of shapes and symbols. For instance, simple geometric shapes or objects, such as squares, rectangles, triangles and circles can indicate people, places and things. It is often desirable and aesthetically pleasing for shapes to be aligned in some manner. For instance, in an office layout diagram including several squares indicating workers' cubicles, it is desirable to have all of the squares line up in a straight line so that one edge will look like an aisle or hallway. This alignment proves difficult when objects are manually dragged and placed in a diagram.

To assist users align objects in drawings, some drawing programs support a static gridline feature. Static gridlines, generally, act as electronic graph paper, providing straight lines to assist the user align several individual shapes. An additional feature, called "snap", automatically aligns the shapes that the computer determines are proximately located to one of the static gridlines. When proximity to a static gridline is sensed during placement of a shape, the computer automatically aligns the shape to the proximal static gridline. The snap feature allows the users to quickly and accurately align the individual shapes, and produce an aesthetically pleasing drawing.

One difficulty brought on by snap gridlines is that the user must conform the placement of the shapes to the gridlines already on the screen. When the user wants to place shapes at areas other than where the grids are placed, the user is again forced to place these shapes by freehand.

In view of the need by many users for assistance in placing objects in a drawing program, a system that dynamically changes the gridlines according to objects already placed on the drawing screen and additionally providing snapping to the dynamically placed gridlines would have significant utility.

DETAILED DESCRIPTION OF THE INVENTION

Figure 1:
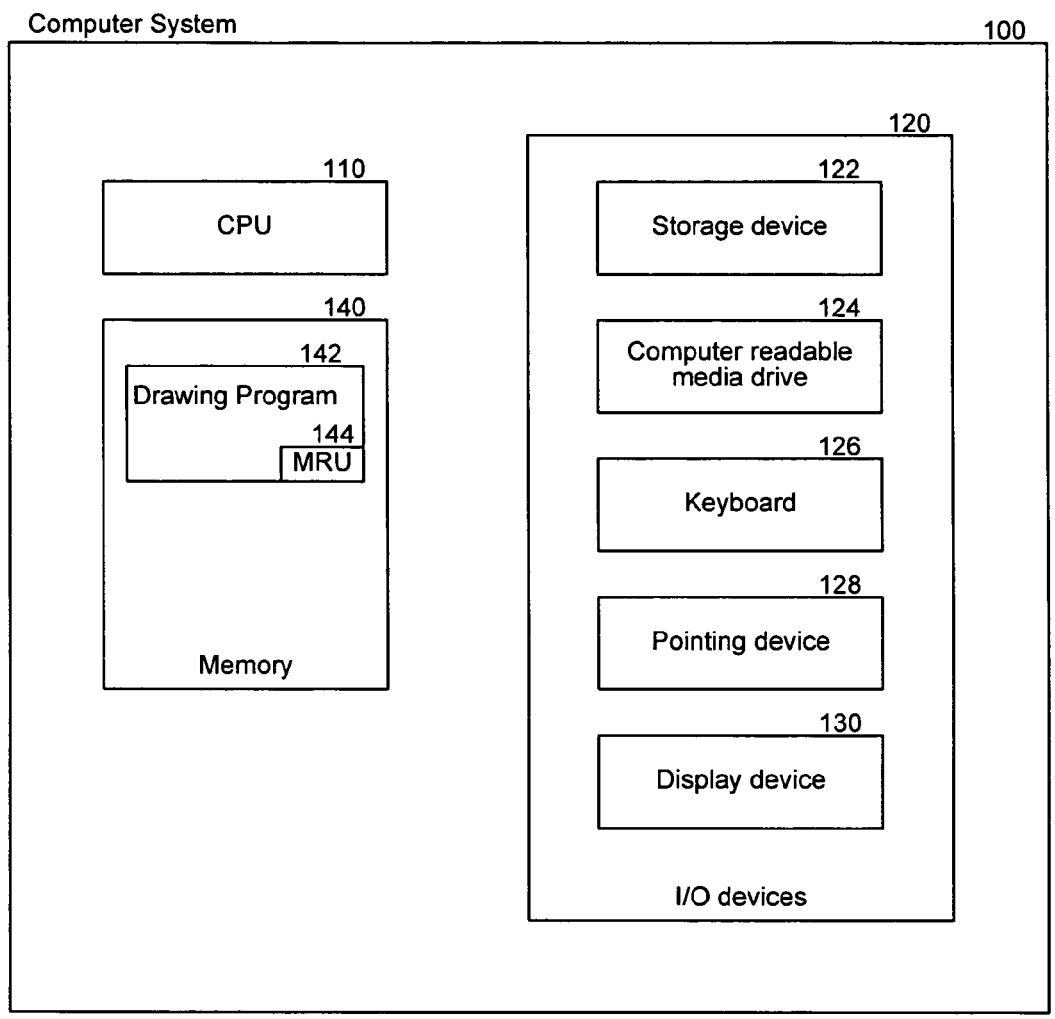
FIG. 1 is a high-level block diagram of a general-purpose computer upon which the drawing program preferably executes.

The present invention provides a system that dynamically establishes and displays gridlines to the user of a drawing program. In a preferred embodiment, the drawing program determines a likely destination of the next user-placed object based on the present location of objects already present in the drawing. Once the likely destination is determined, the drawing program displays a dynamic gridline to the user. If the user wants to align the next object to the already-placed objects, he or she drags the new object near the gridline. Once near the gridline, the drawing program preferably automatically aligns the object to the displayed dynamic gridline, thereby aligning the dragged object to the objects already placed on the drawing.

In a preferred embodiment, the drawing program locates the dynamic gridlines on the display using zones (or "bands") located above, below, and to the sides of the object currently being dragged to a new location on the display. In each of the four bands, the drawing program identifies the objects already placed on the display that are near the dragged object. Based upon a prediction that the dragged object that is proximate to the objects already present on the drawing has a high likelihood of being placed aligned to those shapes, the drawing program establishes dynamic gridlines that are spaced apart the same distance that the currently placed objects are already spaced. This type of dynamic gridlines are termed "across" dynamic gridlines because they run perpendicular to or across, the band. Additionally, the drawing program also establishes dynamic gridlines that indicate the centerlines of the nearest neighbors for easy alignment, termed "along" dynamic gridlines because they run along with or parallel to the band. The drawing program displays dynamic gridlines of both types on the drawing screen to assist the user in placing the dragged object on the drawing.

FIG. 1 is a high-level block diagram of a general-purpose computer system upon which the drawing program preferably executes. The computer system 100 contains a central processing unit (CPU) 110, input output devices 120, and a computer memory (memory) 140. Among the input/output devices is a storage device 122, such as a hard disk drive, and a computer-readable media drive 124, which can be used to install software products, such as the computer drawing program, that are provided on a computer-readable medium, such as a CD-ROM. Other input/output devices include a keyboard 126 for inputting text, a pointing device 128, such as a mouse, for selecting locations, and a display device 130, such as a video monitor for displaying visual information, such as windows and their contents. Typically, the display device 130 is used to show the drawing that the computer user creates. The memory 140 preferably contains the drawing program 142. A portion of the drawing program 142 stored in the memory 140 is a most recently used (MRU) list of the dynamic gridlines 144, which is explained in further detail below. While the drawing program is preferably implemented on a computer system configured as described above, those skilled in the art will recognize that it may also be implemented on computer systems having different configurations.

In order to more completely describe the operation of the drawing program 142, its operation is discussed in conjunction with examples. FIGS. 2–4 and 8 are flow diagrams indicating program operation, while FIGS. 5–7 and 9 illustrate the examples.

Figure 2:
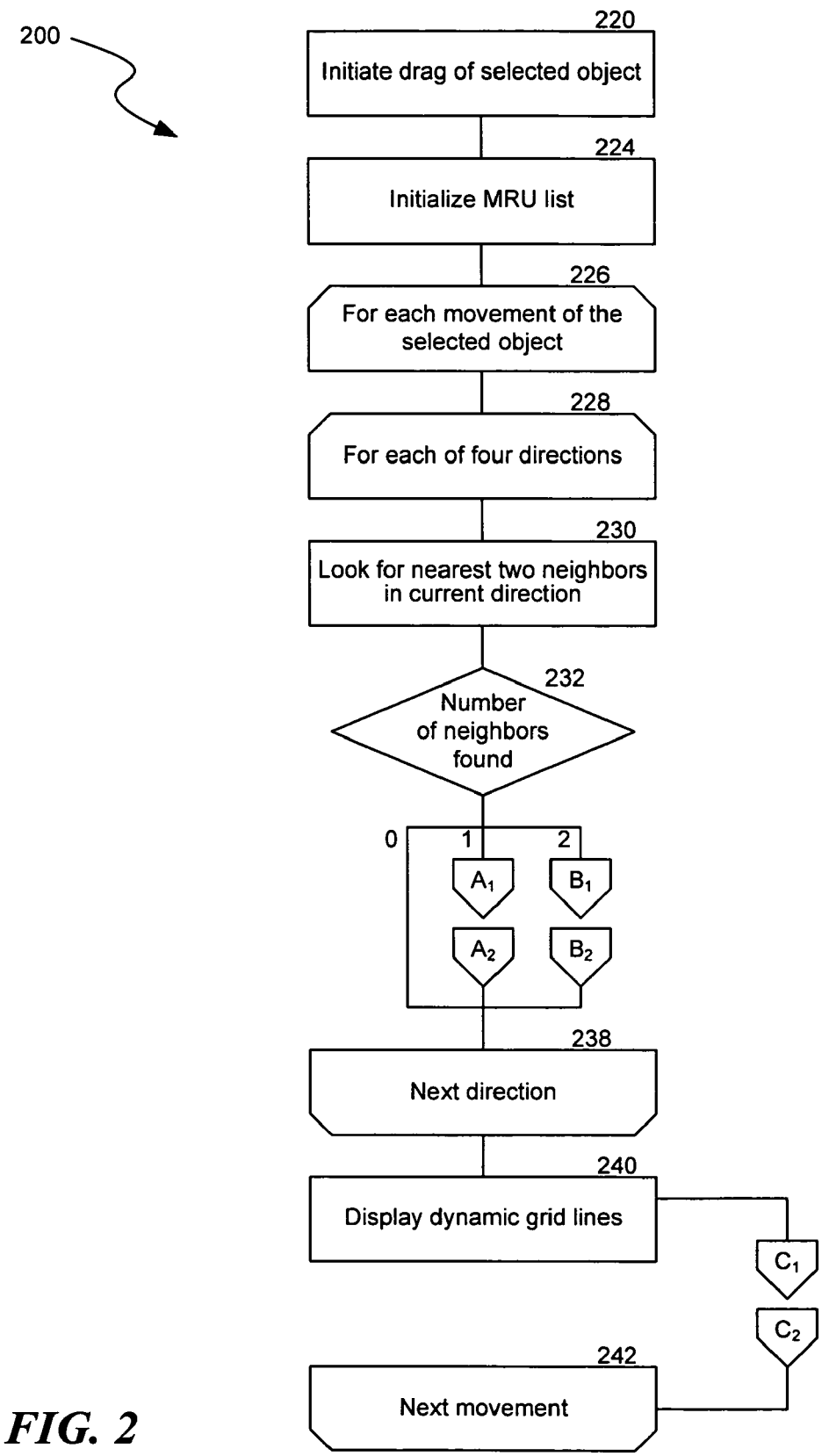
FIG. 2 is a flow diagram showing the steps preferably performed by the dynamic grid generator of the drawing program.
Figure 5:
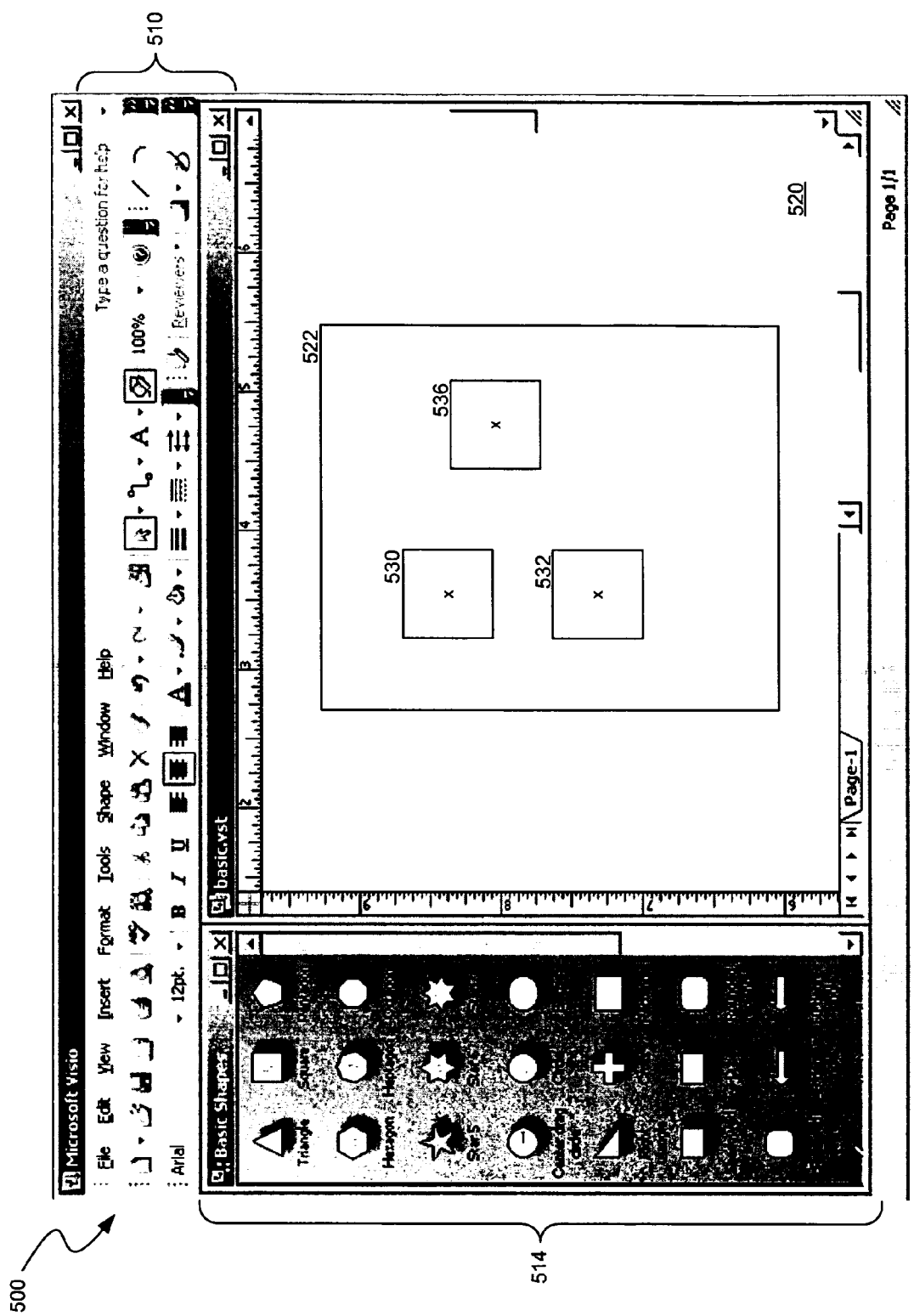
FIG. 5 is a screen-shot showing operation of the dynamic grid drawing program.
Figure 6:
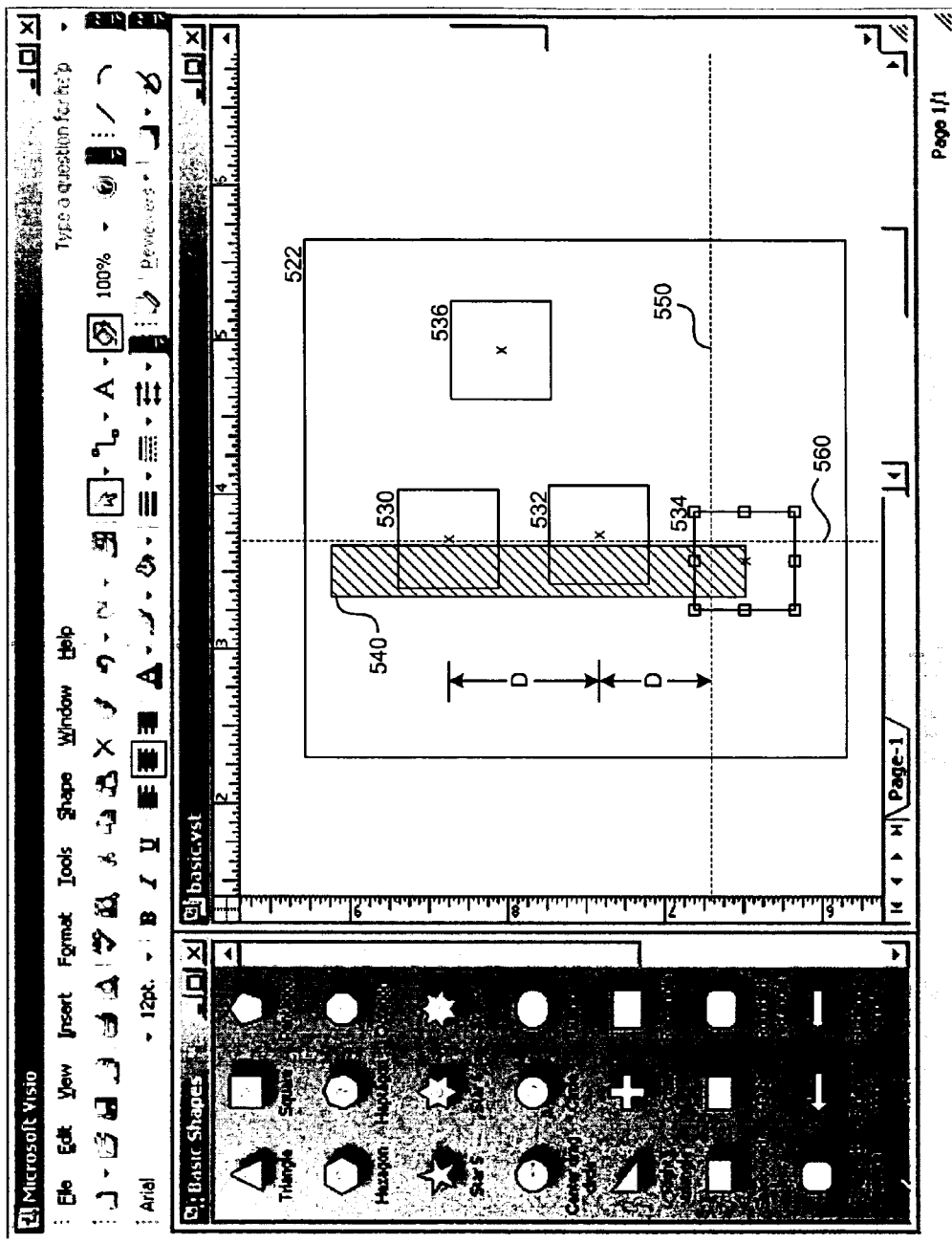
FIG. 6 is a screen-shot showing operation of the dynamic grid drawing program.
Figure 7:
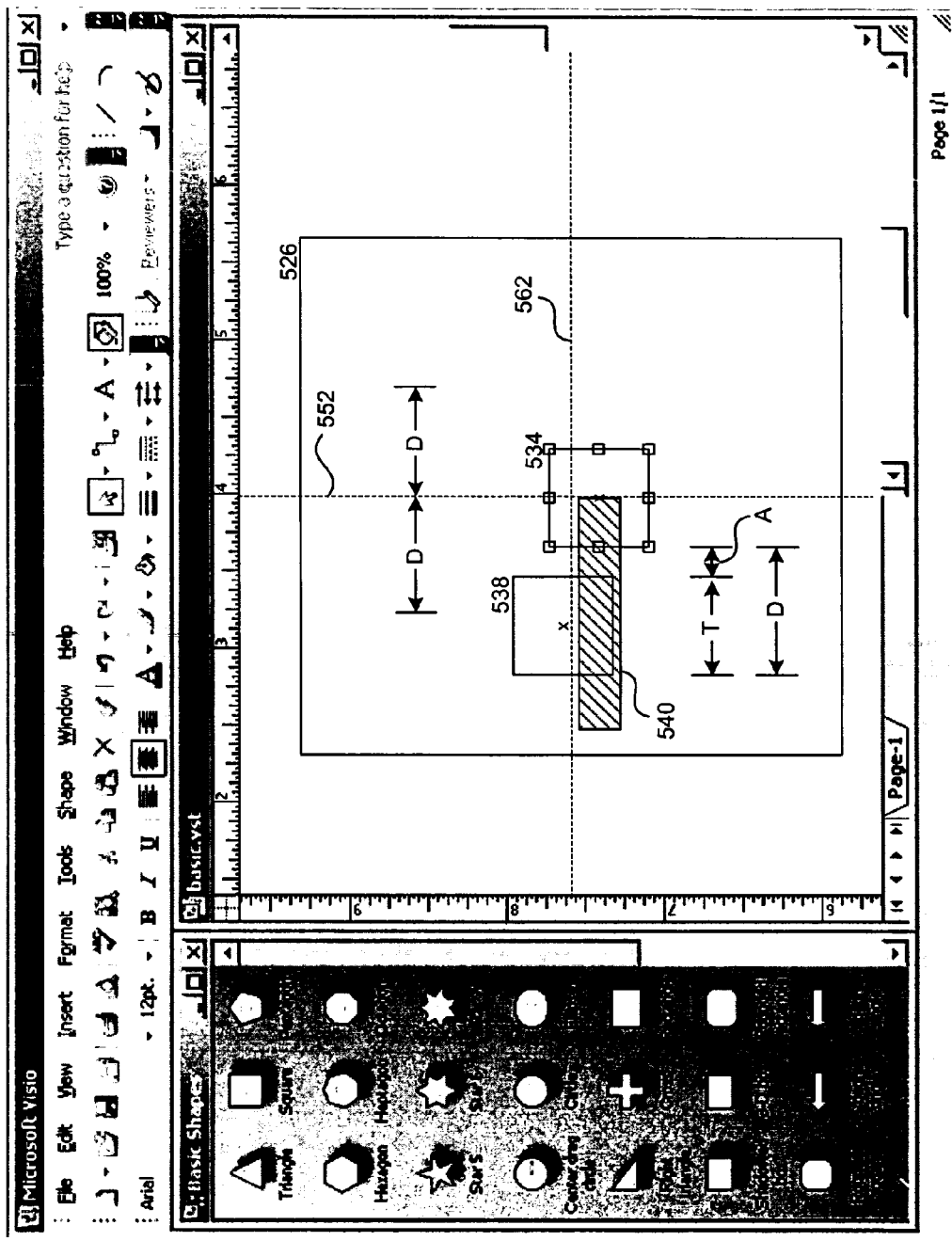
FIG. 7 is a screen-shot showing operation of the dynamic grid drawing program.

FIG. 2 is a flow diagram showing the general steps preferably performed by an embodiment of the drawing program 142 to calculate and display the dynamic grids to a user of the drawing program. These steps are described by way of an example illustrated in FIGS. 5–7. FIG. 5 is a screen shot of a drawing program such as Visio 2000 available from Visio Incorporated of Seattle, Wash. The screen 500 consists of three main areas, a toolbar area 510, a drawing palette 514 and a page layout 520. The page layout 520 includes a drawing page 522 for construction by the user of the drawing program. In the example shown in FIG. 5, the user has already placed three objects, 530, 532, and 536 on the drawing page 522. Objects 530 and 532 are vertically aligned. In step 220, the user selects an object such as from the drawing palette 514, an object already on the page layout 520, or by making a copy of an already-placed object with a control-drag as is known in the art, and begins dragging it on the drawing page 522. FIG. 6 is a screen shot showing the same drawing page as on FIG. 5, 522, but at a time later than that shown in FIG. 5. Within FIG. 6, reference numbers identical to those on FIG. 5 indicate identical elements. A selected object 534 that was selected to be dragged in step 220 is distinguished from objects already placed on the drawing page 522, such as the objects 530 and 532, in some manner. In FIG. 6, the object selected to be dragged for placement in the drawing 534 is delineated by a series of drag boxes placed around the perimeter of the selected object, as is known in the art.

In step 224, the drawing program initializes the MRU list 144 data structure by clearing the MRU list of entries. The MRU list 144 is a list of recently calculated dynamic gridlines preferably stored in the memory 140. The purpose and operation of the MRU list 144 are described further below.

Step 226 is the top of a first loop in the flow 200. The bottom of the first loop is step 242, located near the bottom of FIG. 2. All of the steps located between the top of the first loop 226 and the bottom of the first loop 242 are repeated each time that the selected object 534 is moved. As an example, if the selected object 534 is being dragged by a mouse, as is known in the art, steps 228 through 240 are repeated as long as the object continues to be dragged.

Step 228 is the top of a second loop, which ends at step 238. The second loop is contained within the first loop. For every movement of the selected object 534, the steps contained within the second loop are repeated four times, one for each direction above, below, and to each side of the selected object 534.

In step 230, the drawing program 142 searches the band in the current direction selected in step 228 for the two objects nearest the selected object. For example, for a band 540 above the selected object 534, the drawing program 142 identifies as the nearest two neighbors above the selected object 534 the placed objects 530 and 532.

The band in which the drawing program looks for the nearest neighbors in the current direction is centered at the midpoint of the selected object 534, for instance, the band 540 shown in FIG. 6. The band 540 is not actually seen in the page layout 520 nor displayed to the user on the drawing page 524, but is shown only for informational purposes. The width of the band 540 may be wide or narrow, including wider than the selected object 534 itself. It is typically narrower than the selected object 534. When the drawing program 142 is searching for the nearest two neighbors in the current direction in step 230, only objects that are within the band 540 are considered. Therefore, although an object 536 on the drawing page 522 is literally "above" the selected object 534, it is not considered as one of the nearest two neighbors in the current direction for step 230, as it is not located within the band 540.

In step 232, the drawing program 142 analyzes the number of neighbors found within the band 540 in the current direction. Because step 230 only looks for the nearest two neighbors, only three paths out of step 232 are available, that is, zero neighbors found, one neighbor found, or two neighbors found. Even if more than two neighbors are in the band, the drawing program 142 only considers the closest two neighbors. If no neighbors are found in the current direction in step 232, the flow 200 continues to the bottom of the second loop 238. At that step, the drawing program 142 selects a new direction, for instance to one of the sides of the selected object 534, and the control returns to the top of the second loop, 228.

In the example shown in FIG. 6, the number of nearest two neighbors in the above direction located by step 232 is two. Had a control key copy of the selected object 534 been chosen as the selected object, the selected object 534 would be a candidate for one of the neighbors in the above direction for the control key copy. That directs the flow 200 through connection B1 to step 282 labeled B, shown in FIG. 4.

Steps 282–294 are invoked only when exactly two neighbors are found in step 232, and these steps calculate where to place the dynamic gridlines that are shown to the user of the drawing program 142. The flow 280 preferably calculates exactly two gridlines that cross the particular direction that was selected in step 228. For example, on the drawing page 522 of FIG. 6, the drawing program 142 calculates where to establish a first across dynamic gridline 550 and a second across dynamic gridline that is not shown in FIG. 6. The method that the drawing program uses to establish the across gridlines is different than the method to establish the along dynamic gridline 560, also shown in FIG. 6. Once calculated, the drawing program places the across and along gridlines in the MRU list 144 for later display processing.

Step 282 in the flow 280 determines the centers of each of the nearest neighbors 530, 532. Determining these locations is well known in the art. Using the location of the centers, in step 284 the location of the first across dynamic gridline 550 is calculated. The drawing program 142 calculates where to place this line 550 by first calculating the distance between the centers of the two closest neighbors, objects 530 and 532. In FIG. 6, this is indicated as a distance D. The drawing program 142 then, beginning at the center of the closest neighbor 532, extends D distance in the direction opposite of the current direction. In this example, since the neighbors 530 and 532 are above the selected object 534, the drawing program 142 extends D distance down from the center of the closest neighbor 532. The first across dynamic gridline 550 is established "D" distance from the center of the closest neighbor 532. Once the drawing program 142 establishes where this first across dynamic gridline 550 will be, it places the location of the first dynamic gridline in the MRU list 144 in step 286. At this stage of the flows 200 and 280, the first dynamic gridline has only been calculated and stored in the MRU list 144, but not actually displayed to the user, which is detailed below.

In step 290, the drawing program 142 establishes second across dynamic gridline another D distance from the first across dynamic gridline 550, in a direction opposite that of the current direction. In this example, the second across dynamic gridline is D distance below the first dynamic gridline 550, but, for clarity, the second dynamic gridline is not shown in FIG. 6. The location of the second dynamic gridline is also stored in the MRU list 144 in step 292.

In the preferred embodiment, the drawing program 142 establishes only two across dynamic gridlines in the flow 280. Of course, the invention is not limited to calculating only two across dynamic gridlines and any number of dynamic gridlines could be calculated.

In step 294, the drawing program 142 establishes and places in the MRU list 144 an along dynamic gridline, such as 560 seen in FIG. 6 that runs through the center of each of the nearest neighbors. In the example shown in FIG. 6, only one along gridline, 560, is added to the MRU list 144 because both the objects 530 and 532 share the same centerline. No along gridlines are added for objects that are not either the first or second closest objects within the band 540. The flow 280 ends at step 294, and the flow 200 returns through connector B2 to step 238 of the flow 200, seen in FIG. 2. In step 238, the next direction is selected, for instance to the side of the selected object 534, and the flow 200 returns to step 228 for the second of the four directions.

Figure 3:
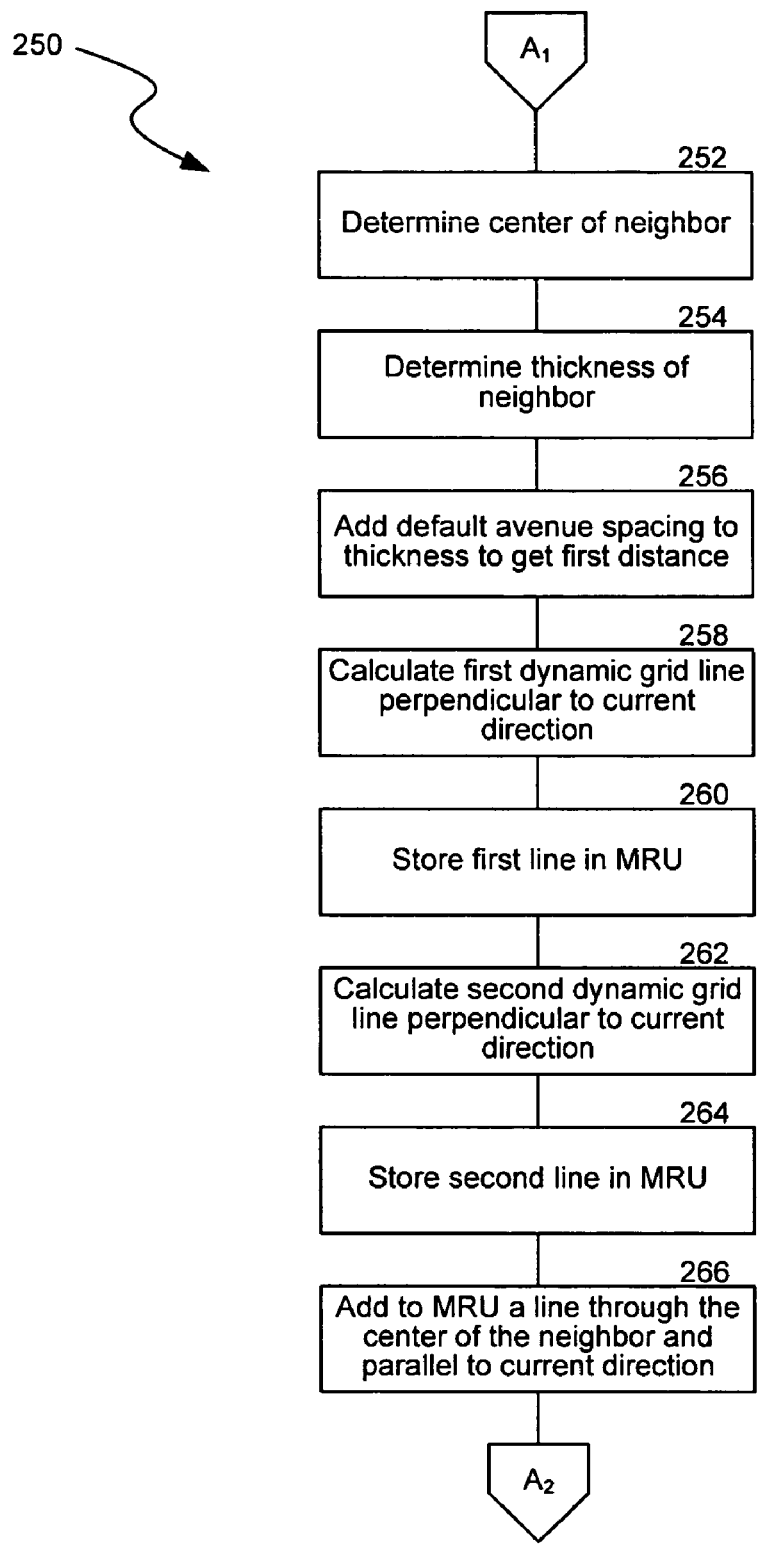
FIG. 3 is a flow diagram showing the steps preferably performed by the dynamic grid drawing program.
Figure 4:
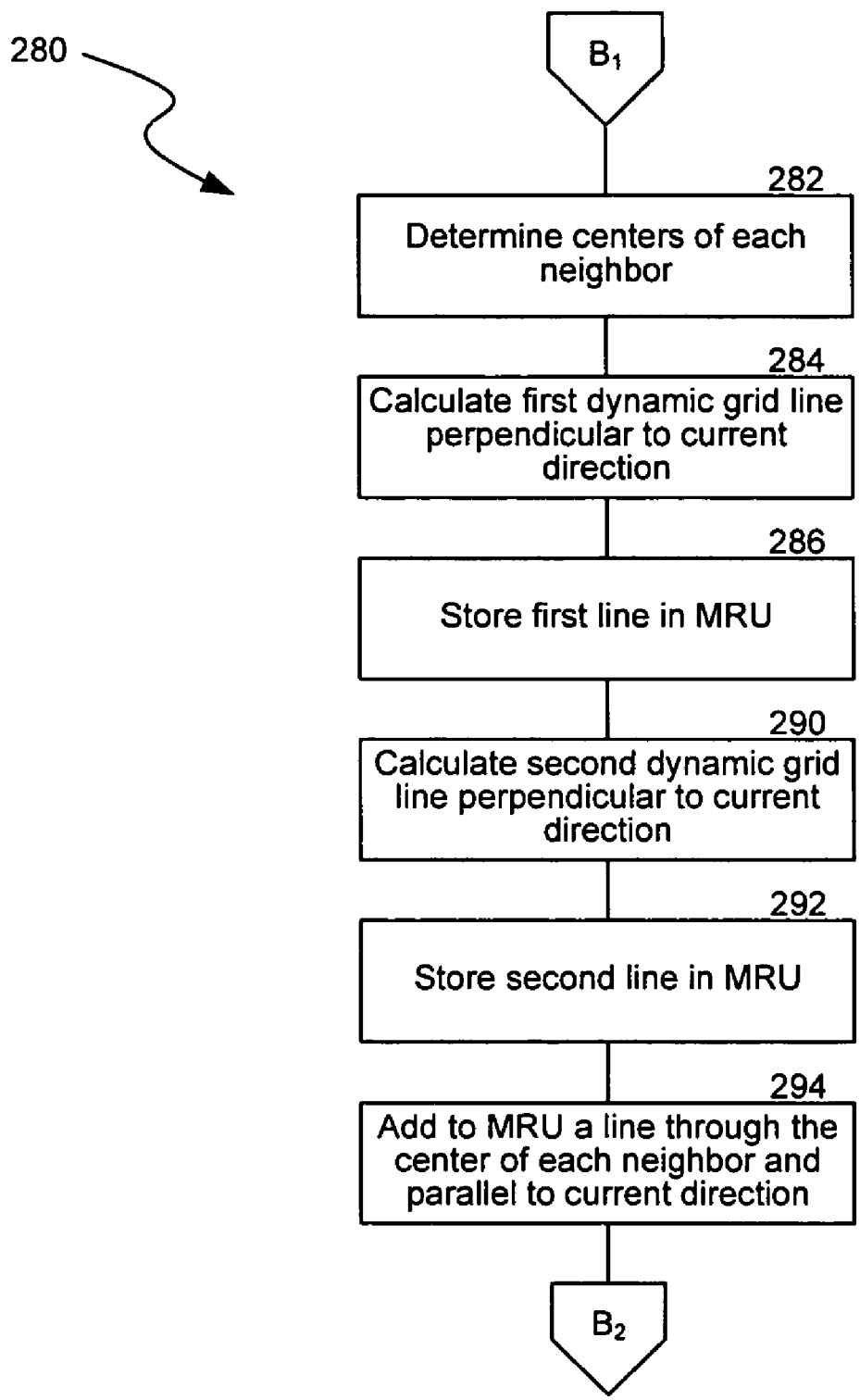
FIG. 4 is a flow diagram showing the steps preferably performed by the dynamic grid drawing program.

In one embodiment, the second of the four directions is to the left-hand side of the selected object 534. For the example shown in FIG. 7, the drawing page 522 of FIG. 6 has been replaced with the drawing page 526 of FIG. 7. The selected object 534 appears along with a previously placed object 538. Assume that the object 538 is the only object already placed in the drawing page 526. In step 230 of the flow 200 of FIG. 2, the drawing program 142 searches for the nearest two neighbors in the current direction (to the left). In this case, the number of neighbors found in the box 232 is one, so the flow 200 proceeds through the connector A1 to step 252 in FIG. 3. FIG. 3 shows the steps that occur between the connectors A1 and A2, the flow 250. In step 252, drawing program 142 determines the center of the neighbor, and in step 254, also determines the thickness of the neighbor, where thickness is defined for these purposes to be the distance along the edge of the object in the same direction as the current direction. In this example, the thickness of the object 538 is the length of its bottom edge, indicated by the letter T. In step 256 of the flow 250 the drawing program 142 adds a default avenue distance, such as 0.5", to the thickness of the neighbor 538. The combination of the thickness and the default avenue spacing is the distance D shown in the bottom of FIG. 6. In step 258 of the flow 250, the drawing program 142 establishes the first across dynamic gridline. The first dynamic gridline is D distance away from the center of the first neighbor, as shown near the top of FIG. 7. Similar to before, this first dynamic gridline 552 is only stored in the MRU list 144 in step 260, and not actually displayed to the user yet. In step 262, a second across dynamic gridline is calculated another D distance away from the first dynamic gridline 552, and stored in the MRU list 144 in step 264.

Finally in step 266, an along dynamic gridline running through the center of the neighbor 538 is established and added to the MRU list 144. In the example shown in FIG. 7, line 562 indicates the centerline stored in the MRU list 144. The flow 250 then returns through connector A2 back to step 238 of FIG. 2.

Because this is the second time the flow 200 reached step 238, another direction is chosen, for instance below the selected object, and control returns back to step 228. Assume in step 230 that no objects are below the selected object 534, so the outcome of step 232 passes directly to step 238 for the fourth direction, to the right of the selected object. Control returns to step 228 for this final direction. Also assume that there are no neighbors to the right of the selected object 534 so the flow 200 continues directly to step 238 and all four directions of the second loop have been completed.

The flow 200 continues to step 240 where the drawing program 142 determines which dynamic gridlines to display to the user. The drawing program 142 makes this decision in the steps outlined between connectors C1 and C2 of FIG. 8. In Step 320 of FIG. 8, the drawing program 142 calculates the center position of the object being dragged, for instance the selected object 534 shown in FIG. 6. Once the center position of the dragged object is known, the drawing program 142 searches the MRU list 144 to find the horizontal line closest to the center of the dragged object and the vertical line closest to the center of the dragged object in step 322 and 324, respectively. Although the drawing program 142 originally distinguished between across and along type dynamic gridlines, once the MRU list 144 stores the gridlines, the drawing program no longer differentiates between types. The MRU list 144 only stores information to determine whether the stored line is horizontal or vertical, and its location.

In a preferred embodiment, the MRU list 144 contains 16 spaces for entries, but, of course, could contain as many or as few spaces as desired. As described above, the MRU list 144 operates according to a most recently used algorithm. Each time the drawing program 142 adds a dynamic gridline entry to the MRU list 144, the entry is added at the top of the list. Then, the entry that was at the top position moves down into the second position, and the entry that was in the second position moves into the third position, and so on. The entry that was in the sixteenth position is discarded when the entry that was in the fifteenth position replaces it. If the drawing program 142 adds a line to the top of the MRU list 144 that already exists elsewhere in the list, the order of the list is changed, but the sixteenth entry is not discarded. For example, if the drawing program 142 places at the top of the MRU list 144 an entry that was already in the fourth position in the list, the previously first entry moves to the second position and the previously second line moves to the third position. Then, the entry that was in the third position moves into the vacated fourth position. None of the entries 5–16 are disturbed.

After the drawing program 142 establishes which horizontal and vertical lines in the MRU list 144 are closest to the center of the dragged object in steps 322 and 324, the drawing program 142 decides whether to show these closest lines in steps 326–332. The drawing program 142 only displays dynamic gridlines that are close to the dragged object because otherwise the display appears cluttered. In the preferred embodiment, a maximum of one horizontal dynamic gridline and one vertical dynamic gridline appear on the drawing. Of course, more or less dynamic gridlines could be displayed in other embodiments of the invention.

In step 326, the drawing program 142 evaluates whether the horizontal dynamic gridline closest to the center of the dragged object is within a display tolerance, such as 25 pixels. The display tolerance can, of course, be another distance as desired without changing the scope of the invention. If the center of the dragged object is within 25 pixels of the closest horizontal dynamic gridline, the gridline is displayed on the drawing page in the step 328. For instance, in FIG. 6 the horizontal dynamic gridline 550 is displayed on the drawing page 524 because the center of the selected object 534 is within 25 pixels of the dynamic gridline 550. Similarly, steps 330 and 332 evaluate whether the closest vertical dynamic gridline selected in the step 324 is within the display tolerance, and, if so, displays the vertical dynamic gridline as well. In FIG. 6, the vertical dynamic gridline 560 is displayed to the user.

Figure 9:
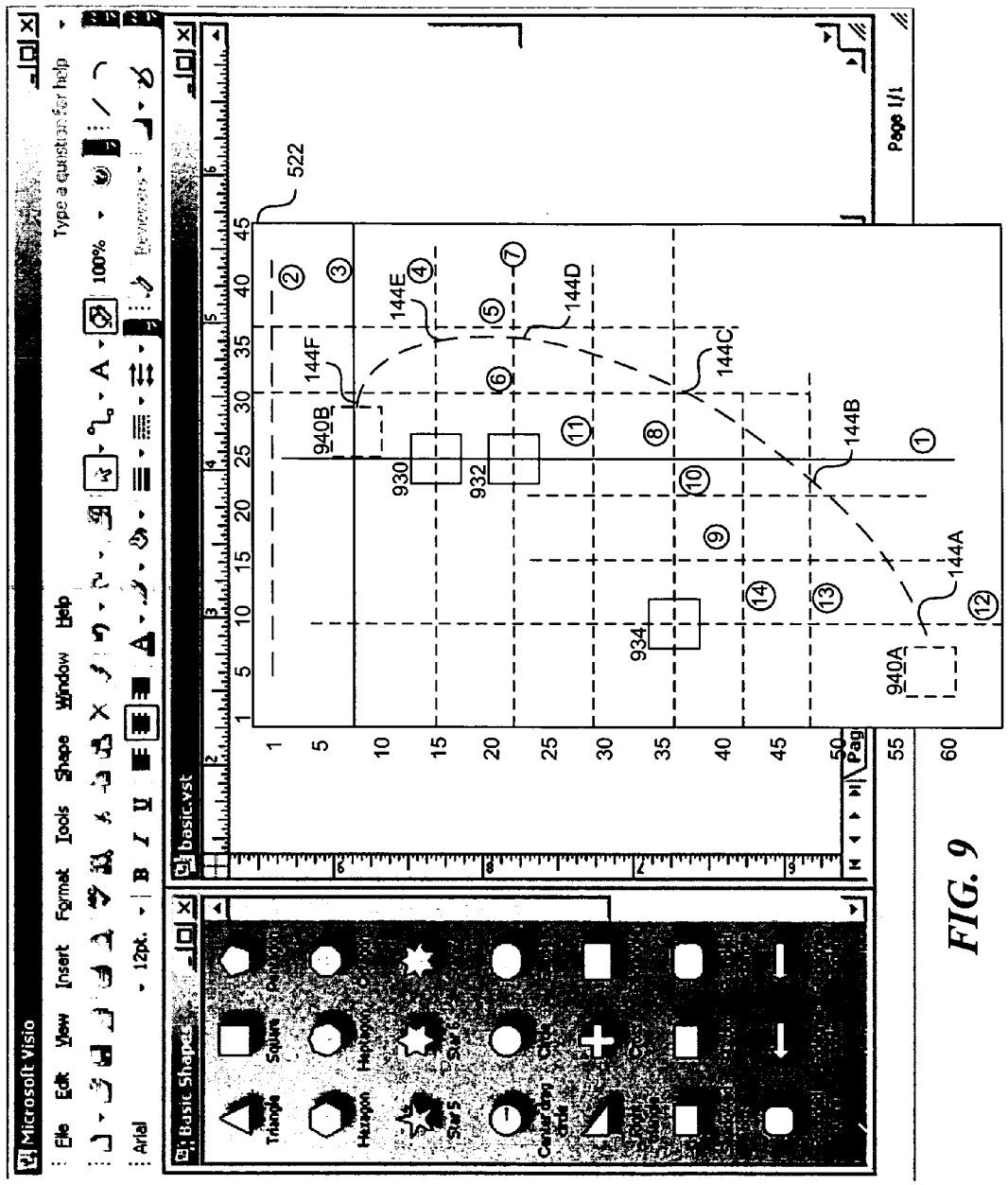
FIG. 9 is a screen-shot showing operation of the dynamic grid drawing program.

FIG. 9 shows a drawing page 528. The tables A–F included in the text show a set of MRU lists 144A–F that accompanies FIG. 9 and illustrates how entries are placed in the MRU list, and how the most recently used algorithm operates. The drawing page 528 includes placed objects 930, 932, and 934. Additionally, a selected object 940 begins at a location 940A and a user drags it along a dotted path to a final position 940B. Labels 144A–144F on the dotted line correspond to the MRU lists 144A–F shown in the tables A–F at the locations indicated on the dotted line. The solid and dotted straight lines shown on the drawing page 528 represent dynamic gridlines that are in the MRU list 144F, at the time the selected object 940 is at position 940B. The dotted lines represent lines that are stored in the MRU list 144F and not displayed, while the solid lines represent the one horizontal and one vertical line that are displayed when the selected object 940 is at position 940B. The dynamic gridlines in FIG. 9 are labeled according to their ultimate position in the MRU list 144F.

The user begins dragging the selected object 940 from location 940A. When the placed object 934 enters the zone above the selected object 940, the drawing program 142 enters three lines in the MRU list 144A (Flow 200, FIGS. 2–4). First, the drawing program 142 inserts a first across dynamic gridline into the MRU list 144A, having a location of H-42 (the $42^{nd}$ horizontal line, as measured from a 0—0 origin in the upper left hand corner of the drawing page 528). Of course, the MRU list 144 will work with coordinate systems other than that shown in this example.

TABLE A

MRU 144A

| MRU# | H/V | Locat. | FIG. 9 label |
|---|---|---|---|
| 1 | V | 12 | 12 |
| 2 | H | 48 | 13 |
| 3 | H | 42 | 14 |
| 4 | | | |
| 5 | | | |
| 6 | | | |
| 7 | | | |
| 8 | | | |
| 9 | | | |
| 10 | | | |
| 11 | | | |
| 12 | | | |
| 13 | | | |
| 14 | | | |
| 15 | | | |
| 16 | | | |

The first across dynamic gridline is labeled "14" and is entered in the top position of the MRU list 144A. The labels in FIG. 9 indicate the final position that the dynamic gridlines will occupy in the MRU list 144F in FIG. 10, at the end of the drag. The labels used in the text indicate the position of the line as well as the label of the line, so that H-42(14) indicates that the dynamic grid line that is on the Horizontal $42^{nd}$ line will occupy the $14^{th}$ place in the MRU list 144F at the end of the drag.

Once the first across dynamic gridline H-42(14) is established and entered into the MRU list 144A, the second across dynamic gridline H48(13) is established and entered at the top position of the list. This pushes down H-42(14) to the second position, and H-48(13) temporarily occupies the top position. Eventually, H-48(13) will be pushed to location 13, where it resides in the MRU list 144F shown in Table F. Finally, the first along gridline 12 is established at the centerline of the placed object 934, and V-12(12) is placed at the top of the MRU list 144A.

The user continues dragging the selected object 934 along the curved dotted path to the location indicated as being represented by MRU list 144B, shown below in Table B. The static object 932 appears in the band above the selected object 940. Three more lines are added to the MRU list 144B, the two across dynamic grid lines below the static object 932, as well as the along dynamic grid line running through the center of the static object 932. First, the first across dynamic grid line 11, located at H-29(11) is entered on the top of the MRU list 144B. Then the second across dynamic grid line 8 is entered in the MRU list, at H-36(8). The $36^{th}$ Horizontal line also happens to be the horizontal centerline for the static object 934. Therefore, this line will be escalated according to the most recently used algorithm, as below described. So, although H-36(8) would normally be the $10^{th}$ entry from the top, H-36(8) will be used again later, ultimately making it the $8^{th}$ entry from the top. For now, the line H-36(8) is at the top of the MRU list 144B in Table B. Finally, the along grid line for the static object 932 is entered at the top of the MRU list 144, V-24(1). Since the centerline for both the static objects 932 and 930 is the same, the entry for 1 is only entered once in MRU list 144B.

TABLE B

MRU 144B

| MRU# | H/V | Locat. | FIG. 9 label |
|---|---|---|---|
| 1 | V | 24 | 1 |
| 2 | H | 36 | 8 |
| 3 | H | 29 | 11 |
| 4 | V | 12 | 12 |
| 5 | H | 48 | 13 |
| 6 | H | 42 | 14 |
| 7 | | | |
| 8 | | | |
| 9 | | | |
| 10 | | | |
| 11 | | | |
| 12 | | | |
| 13 | | | |
| 14 | | | |
| 15 | | | |
| 16 | | | |

The user continues to drag the selected object 940 until the static object 934 appears in the left-side band for the selected object, where three more entries are added, corresponding to MRU list 144C, shown below as Table C. The first across dynamic grid line V-21(10) for the static object 934 is entered as 10, then the second across dynamic grid line V-15(9) is entered as 9. The along dynamic gridline for the static object 934 would be added next, as H-36(8). Recall that the H-36(8) line already exists in the MRU list 144, added as the second across dynamic grid line for static object 932. Since H-36(8) already exists, the drawing program 142 simply pulls it from its current position in the MRU list 144C and places it at the top of the list. The relative location of H-36(8) can be seen in the MRU list 144B, directly above the entry H-29(11). Therefore, all of the entries above the H-29(11) entry in the MRU 144C are rearranged to allow H-36(8) to be entered at the top. The entries that moved in MRU 144C are indicated by an "m" following the MRU#. It would be easier to simply allow duplicate entries in the MRU list 144, however, because the MRU list is only allocated 16 entries, it is preferable to maintain the MRU list in this manner because it provides more of a selection for dynamic grid lines to be displayed.

TABLE C

| | MRU 144C | | |
|---|---|---|---|
| MRU # | H/V | Locat. | FIG. 9 label |
| 1-m | H | 36 | 8 |
| 2-m | V | 15 | 9 |
| 3-m | V | 21 | 10 |
| 4-m | V | 24 | 1 |
| 5 | H | 29 | 11 |
| 6 | V | 12 | 12 |
| 7 | H | 48 | 13 |
| 8 | H | 42 | 14 |
| 9 | | | |
| 10 | | | |
| 11 | | | |
| 12 | | | |
| 13 | | | |
| 14 | | | |
| 15 | | | |
| 16 | | | |

The user continues dragging the selected object 940 to the location 144D so the static object 932 comes within the left-hand band of the selected object. Three more lines are added to the MRU 144D, shown below as Table D. Added are V-30(6), the first across dynamic gridline, V-36(5) the second across dynamic gridline, and H-22(7), the along dynamic gridline.

TABLE D

| | MRU 144D | | |
|---|---|---|---|
| MRU # | H/V | Locat. | FIG. 9 label |
| 1 | H | 22 | 7 |
| 2 | V | 36 | 5 |
| 3 | V | 30 | 6 |
| 4 | H | 36 | 8 |
| 5 | V | 15 | 9 |
| 6 | V | 21 | 10 |
| 7 | V | 24 | 1 |
| 8 | H | 29 | 11 |
| 9 | V | 12 | 12 |
| 10 | H | 48 | 13 |
| 11 | H | 42 | 14 |
| 12 | | | |
| 13 | | | |
| 14 | | | |
| 15 | | | |
| 16 | | | |

Continuing the drag of the selected object 940 to the location 144E and past the static object 930 again uses the most recently used algorithm. When the entry V-30(6) is added for the first across dynamic gridline, it moves from just above the H-36(8) entry to the top of the MRU 144E, shown below as Table E. Similarly, the V-36(5) entry is then promoted to the top of the MRU list 144E. Finally, the first across dynamic gridline for the static object 930 is added at the top of MRU 144E, H-15(4).

TABLE E

| | MRU 144E | | |
|---|---|---|---|
| MRU # | H/V | Locat. | FIG. 9 label |
| 1-m | H | 15 | 4 |
| 2-m | V | 36 | 5 |
| 3-m | V | 30 | 6 |
| 4-m | H | 22 | 7 |
| 5 | H | 36 | 8 |
| 6 | V | 15 | 9 |
| 7 | V | 21 | 10 |
| 8 | V | 24 | 1 |
| 9 | H | 29 | 11 |
| 10 | V | 12 | 12 |
| 11 | H | 48 | 13 |
| 12 | H | 42 | 14 |
| 13 | | | |
| 14 | | | |
| 15 | | | |
| 16 | | | |

When the user drags the selected object 940 to its final position of 940B, the static objects 930 and 932 are in the band directly below the selected object. This causes the drawing program 142 to generate its final set of three entries, H-8(3), H-1(2), and V-24(1). Notice that the V-24(1) entry was in the eighth position of the MRU list 144E, however, the MRU algorithm pulled it from that position, shifted all of the entries above that position down by one, and entered V-24(1) as the top position in the list, because it is the most recently used. All of the entries that were required to move due to the algorithm are labeled "m" in MRU 144F, shown below as Table F. The final MRU list 144 for this drag of the selected object 940 is as it appears in MRU 144F of Table F.

TABLE F

| | MRU 144F | | |
|---|---|---|---|
| MRU # | H/V | Locat. | FIG. 9 label |
| 1-m | V | 24 | 1 |
| 2-m | H | 1 | 2 |
| 3-m | H | 8 | 3 |
| 4-m | H | 15 | 4 |
| 5-m | V | 36 | 5 |
| 6-m | V | 30 | 6 |
| 7-m | H | 22 | 7 |
| 8-m | H | 36 | 8 |
| 9-m | V | 15 | 9 |
| 10-m | V | 21 | 10 |
| 11 | H | 29 | 11 |
| 12 | V | 12 | 12 |
| 13 | H | 48 | 13 |
| 14 | H | 42 | 14 |
| 15 | | | |
| 16 | | | |

Figure 8:
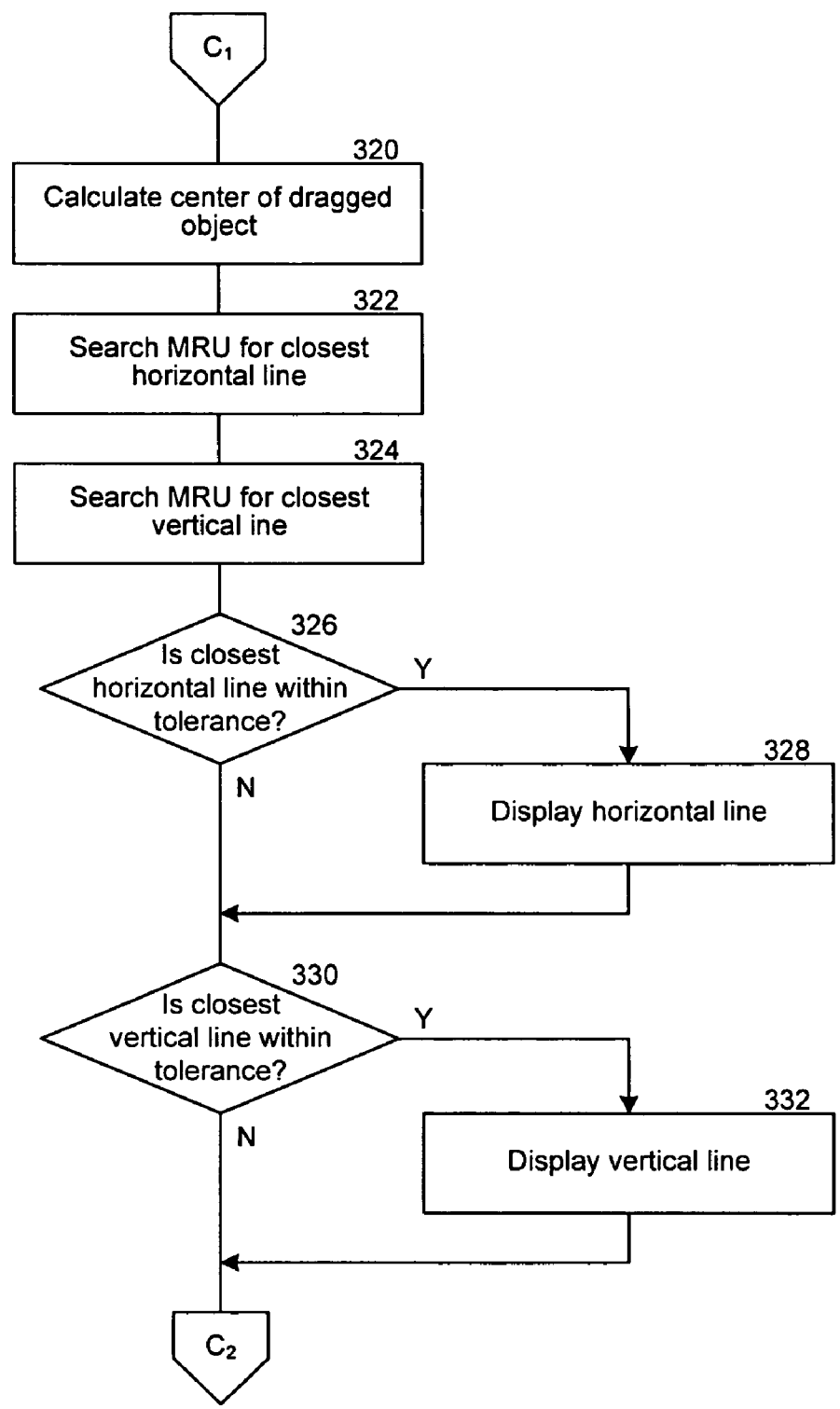
FIG. 8 is a flow diagram showing the steps preferably performed by the dynamic grid drawing program.

The drawing program 142 then goes through the steps illustrated in FIG. 8 to find the vertical and horizontal lines that are closest to the selected object 940. In the example shown in FIG. 9, the closest lines are V-24(1) and H-8(3). A final test proves that these lines are within the rendering tolerance (25 pixels, in this embodiment), so both the horizontal and vertical lines are displayed to the user in FIG. 9.

From the foregoing it will be appreciated that, although specific embodiments of the invention have been described herein for purposes of illustration, various modifications may be made without deviating from the spirit and scope of the invention. Accordingly, the invention is not limited except as by the appended claims.

The invention claimed is:

1. A computer-implemented method for displaying gridlines on a display, comprising:
    identifying a first object and a second object previously placed on the display within a band of a selected object as the selected object is dragged into a location on the display;
    determining the placement of a first gridline aligned to the first object and a second gridline aligned to the second object; and
    displaying at least one of the first gridline and the second gridline in response to the selected object being dragged to the location, wherein the first gridline and the second gridline are operative to assist a user in repositioning the selected object on the display with equal spacing between the first object, the second object, and the selected object, wherein the first gridline and the second gridline are temporarily stored in a list of dynamic gridlines.

2. The method of claim 1 wherein the drawing program adds entries to the list using a "most recently used" algorithm.

3. The method of claim 1 wherein the identifying, determining, and displaying only take place while the object selected to be dragged is actually being dragged.

4. The method of claim 1 wherein the drawing program includes a snap feature that positions the selected object when proximate to the displayed at least one gridline.

5. The method of claim 1 wherein the first gridline and the second gridline are temporarily stored in a list of dynamic gridlines.

6. A computer-implemented method to dynamically display a temporary gridline in a drawing, the method comprising:
    while a selected object is being dragged in the drawing, searching the drawing for a nearest placed object in bands located above, below, and to each side of the selected object;
    determining a location for a temporary gridline relative to the placed object by adding a default avenue distance to the thickness of the placed object; and
    displaying the temporary gridline at the determined location when the selected object is dragged within a certain distance of the temporary gridline, where the temporary gridline facilitates a user of the computer system establishing equal spacing between a plurality of objects.

7. The method of claim 6 wherein static gridlines are also displayed in the drawing.

8. The method of claim 6 wherein the computer system automatically places the selected object aligned to the displayed temporary gridline when the selected object is near to the displayed gridline.

9. The method of claim 6 further including:
    determining a location for an along temporary gridline that runs through the center of the placed object and runs parallel to a particular band.

10. The method of claim 9 further including:
    displaying the along temporary gridline when the selected object is dragged within a certain distance of the along temporary gridline.

11. The method of claim 6 wherein the location of the gridline is entered into a list of gridlines.

12. The method of claim 11 wherein the entries into the list of gridlines are stored using a most recently used algorithm.

13. The method of claim 11 wherein the list of gridlines stores 16 entries.

14. A computer-readable medium whose contents cause a computer system to display gridlines on a display by:
    identifying a first object and a second object previously placed in a line on the display within bands above, below, and to the sides of an object selected to be dragged into a location on the display;
    determining the placement of a first gridline and a second gridline relative to the identified objects, where the first gridline is perpendicular to the second gridline and the first gridline intersects the second gridline along the line indicating a position for the selected object, where the second object is positioned along the line halfway between the first object and the intersection; and
    displaying at least one of the gridlines when the selected object is moved within a predetermined distance of the at least one gridline.

15. The computer-readable medium of claim 14 wherein the contents of the computer-readable medium cause the computer to identify, determine, and display only while the object selected to be dragged is actually being dragged.

16. The computer-readable medium of claim 14 wherein the contents of the computer-readable medium cause the computer to position the object selected to be dragged when proximate to the displayed gridlines.

17. The computer-readable medium of claim 14 wherein the contents of the computer-readable medium cause the computer to temporarily store the gridlines in a list of dynamic gridlines.

18. A computer-implemented method for assisting a drawing program, comprising:
    moving a selected object on an electronic drawing page;
    identifying a first object and a second object, where the first object and the second object were previously placed on the electronic drawing page and the first object is presently located a distance below the second object;
    determining a likely destination of the selected object based on the present locations of the first object and the second object, where the likely destination is located the distance below the first object; and
    indicating to a user of the drawing program the determined likely destination as the selected object is moved in the electronic drawing page, wherein indicating the determined likely destination comprises:
        establishing dynamic gridlines for the drawing, wherein the dynamic gridlines are temporarily stored in a list of dynamic gridline; and
        displaying the dynamic gridlines to the user.

19. The method of claim 18 wherein the drawing program adds entries to the list using a "most recently used" algorithm.

20. The method of claim 18 wherein a maximum of one horizontal gridline and one vertical gridline are displayed to the user.

21. The method of claim 18 wherein the drawing program includes a snap feature that positions the selected object when it is proximate to the displayed gridlines.

22. The method of claim 18 wherein one of the dynamic gridlines is positioned a distance from the first object that is equal to the distance between the first object and the second object.

23. A computer-implemented method to dynamically display temporary gridlines in a drawing, the method comprising:
while a selected object is being dragged in the drawing, searching the drawing for a nearest placed object in bands located above, below, and to each side of the selected object;
determining locations for a first across temporary gridline and a second across temporary gridline, where the first across temporary gridline is a distance D from the placed object and the second across temporary gridline is a distance 2D from the placed object, and where D is computed by adding the width of the placed object and a default avenue distance;
determining a location for an along temporary gridline that bisects the placed object and that runs parallel to the band being searched;
storing the determined locations in a list for retrieving as the selected object is dragged in the drawing; and
as the selected object is being dragged in the drawing, displaying the second across temporary gridline and the along temporary gridline in the drawing.

24. The method of claim 23 wherein the entries into the list are stored using a most recently used algorithm.

25. The method of claim 23 wherein the list of gridlines stores 16 entries.

26. The method of claim 23 wherein to be proximately located to the selected object, the closest gridlines are within a display tolerance of the selected object.

27. The method of claim 26 wherein the display tolerance is 25 pixels.

28. The method of claim 23 wherein static gridlines are also displayed in the drawing.

29. The method of claim 23 wherein the computer system automatically places the selected object aligned to the displayed one of the temporary gridlines when the selected object is near to the displayed gridline.

30. The method of claim 23 wherein the entries into the list of gridlines are stored using a most recently used algorithm.

31. The method of claim 23 wherein a maximum of one gridline that is horizontal in the drawing and one gridline that is vertical in the drawing is displayed.

32. A computer-readable medium whose contents cause a computer system to establish temporary gridlines in a drawing by:
while a selected object is being dragged in the drawing, searching the drawing for a nearest placed object in bands located above, below, and to each side of the selected object;
determining locations for a first across temporary gridline and a second across temporary gridline, where the first across temporary gridline is a distance D from the placed object and the second across temporary gridline is a distance 2D from the placed object, and where D is computed by adding the width of the placed object and a default avenue distance;
determining a location for an along temporary gridline that bisects the placed object and that runs parallel to the band being searched;
storing the determined locations in a list for retrieving as the selected object is dragged in the drawing; and
as the selected object is being dragged in the drawing, displaying the second across temporary gridline and the along temporary gridline in the drawing.

33. The computer-readable medium of claim 32 wherein the contents of the computer-readable medium cause the computer to store locations of the gridlines in a list using a most recently used algorithm.

34. The computer-readable medium of claim 32 wherein the contents of the computer-readable medium cause the computer to further automatically place the selected object aligned to the displayed one of the temporary gridlines when the selected object is near to the displayed gridline.

* * * * *